April 21, 1959   J. JERGER, JR   2,883,294
GLASS COMPOSITION
Filed June 27, 1957
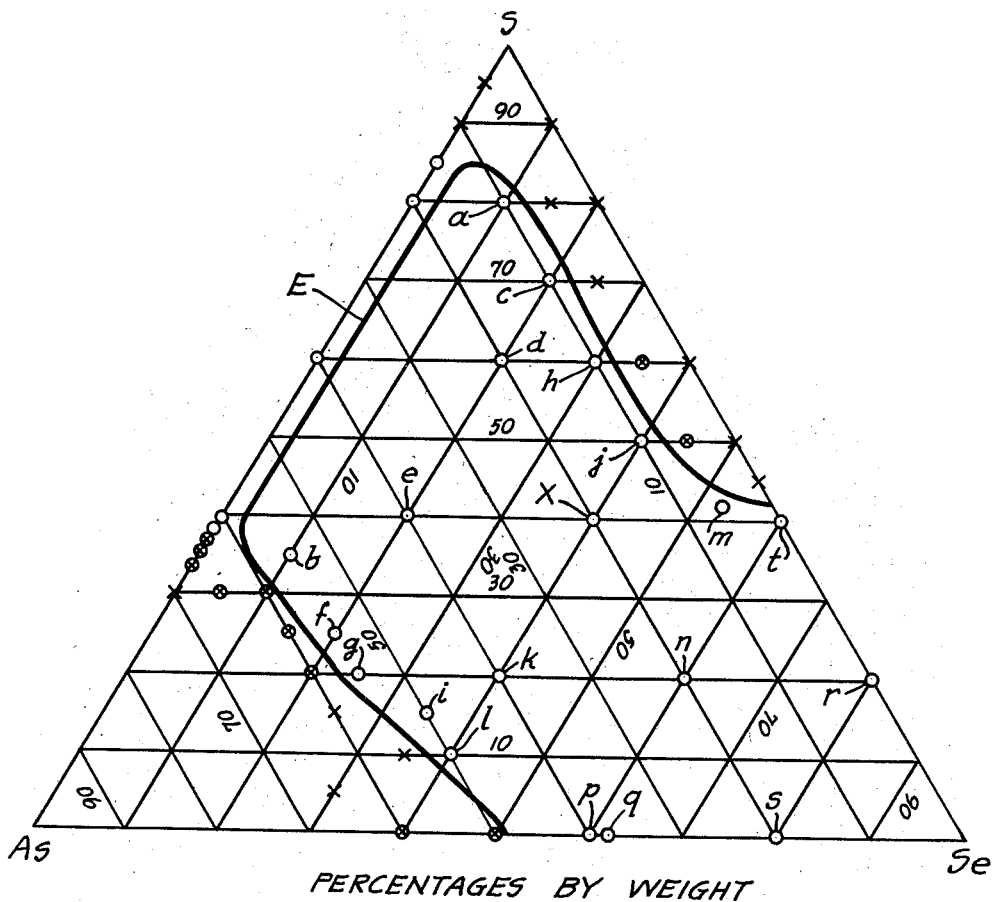
PERCENTAGES BY WEIGHT
INVENTOR.
JOSEPH JERGER, JR.
ATTORNEYS

United States Patent Office 2,883,294
Patented Apr. 21, 1959

2,883,294

GLASS COMPOSITION

Joseph Jerger, Jr., Hempstead, N.Y., assignor to Servo Corporation of America, New Hyde Park, N.Y., a corporation of New York Application June 27, 1957, Serial No. 668,563

1 Claim. (Cl. 106—47)

The present invention relates to glasses produced from mixtures of the elements arsenic, sulfur and selenium.

This application is a continuation-in-part of my co-pending U.S. application Serial No. 417,724, filed March 22, 1954, now abandoned.

In the indicated glass field, arsenic trisulfide ($As_2S_3$) has been known to produce homogeneous glasses. These glasses have desirable properties in the infrared spectrum, but their transmission cut-off does not extend as far into the infrared as is often desirable. For example, arsenic trisulfide glass will selectively transmit infrared radiation up to a transmission cut-off wave length of about 12.5 microns. "Transmission cut-off" as used herein is defined as the wave-length at which the transmission through a 2 mm. thickness of the glass has decreased to 10% and past which the transmission does not again rise above 10%. Arsenic triselenide ($As_2Se_3$) and mixtures of this compound with arsenic trisulfide ($As_2S_3$) are similarly limited.

Insofar as the present application is concerned, infrared rays are divided into two wavelength categories: (1) near infrared which includes wavelengths ranging from the end of the visible spectrum, i.e. about 0.7 micron, up to about 2.5 microns, and (2) far infrared which ranges from about 2.5 up to about 25 microns.

In detecting devices such as infrared spectrometers, gas analyzers, radiation pyrometers, bolometers, etc., it is important that the optical glass employed be selective to infrared radiation. It is desirable that the infrared device operate selectively and flexibly over as wide a wavelength range as possible, e.g. 2.5 to 16 microns, preferably in the range of about 8 to 13 microns in applications involving a transmission of infrared energy from a source of radiation through the atmosphere to an infrared detector.

It is, accordingly, an object of the invention to provide a new field of glass compositions of the character described.

It is another object to provide improved infrared-transmitting glasses.

A further object is to provide new glasses meeting the above objects and yet substantially opaque to visible light.

Another object is to provide a new field of glasses relying primarily on the use of elemental materials rather than on mixtures or compounds.

Other objects and various further features of novelty and invention will be pointed out or will occur to those skilled in the art from a reading of the following specification, in conjunction with the accompanying triaxial diagram. Said diagram depicts a field of glasses in which the substantial components are the elemental materials arsenic, sulfur and selenium.

Briefly stated, I have found a new field of glasses comprising the fused-reaction products of various mixtures of the element selenium with at least one element from the group consisting of arsenic and sulfur, and preferably mixtures of all three. Previous thinking with regard to glasses of the character indicated was based on the knowledge that arsenic trisulfide and arsenic triselenide were, of themselves, glassy and that desirable mixtures of these compounds could be produced, but I have discovered that desirable glasses with improved transmission properties may be formed in regions not relying on the use of these compounds. The amounts of the elements employed do not correspond to binary mixtures of $As_2S_3$ and $As_2Se_3$ and, therefore, are not as narrowly limited.

In the accompanying triaxial diagram, the left-hand corner represents 100 percent arsenic (As), the right-hand corner represents 100 percent selenium (Se), and the upper corner represents 100 percent sulfur (S). Any point in the diagram represents a definite composition; for example, point X represents a composition containing 20 percent arsenic, 40 percent selenium, and 40 percent sulfur.

The solid line E in the diagram is empirically developed and, together with portions of the As—Se and S—Se axes near the selenium corner, encloses an area in which glasses are definitely formed, as compared to the regions outside this area in which the compositions are substantially crystalline. In determining compositions in accordance with the triaxial diagram, the selenium content should not exceed 98%. Close to these borders I have plotted certain specific compositions which have been made; inside the large area defined above, these points all represent glasses and are each identified by a small circle (○). Good glasses will form from compositions anywhere in this area. Except for a portion along the As—S base line, points inside the smaller regions or areas are designated by a cross (×) and represent purely crystalline compositions, and other points in the smaller regions or areas are designated by a cross in a circle (⊗) and represent generally glassy materials with some crystalline content.

The diagram thus shows that compositions along the base line between arsenic and selenium are glassy, as long as the percentage by weight of arsenic is less than substantially 48 percent. If the percentage of arsenic is greater, then the addition of a relatively small amount of sulfur is needed to prevent devitrification of the melt. In similar manner, for the lower percentages of selenium along the base line between sulfur and selenium, the addition of a relatively small quantity of arsenic is needed to prevent devitrification. By adding at least about 2% by weight of selenium to a composition of arsenic and sulfur, and preferably, at least about 5%, optical glasses of improved transmission properties are assured.

Thus, it will be apparent from the triaxial diagram taken together with the foregoing disclosure that the arsenic content may range by weight from about 8% to 60%, the sulfur not exceeding about 85% and selenium substantially the balance ranging from about 2% to 98%. In addition, binary mixtures of arsenic and selenium may range from about 52% to 98% selenium, preferably from about 62% to 98%, the proportion of arsenic to selenium being non-stoichiometric with respect to the compound $As_2Se_3$. Likewise, binary mixtures of sulfur and selenium may also be included within the invention, the amounts of selenium ranging from about 58% to 98% by weight.

Examples of good glasses indicated in the area enclosed by solid line E and portions of the axes near the selenium corner are as follows:

| Designation | Percent As | Percent Se | Percent S |
| --- | --- | --- | --- |
| a | 10 | 10 | 80 |
| b | 55 | 10 | 35 |
| c | 10 | 20 | 70 |
| d | 20 | 20 | 60 |
| e | 40 | 20 | 40 |
| f | 55 | 20 | 25 |
| g | 55 | 25 | 20 |
| h | 10 | 30 | 60 |
| i | 50 | 35 | 15 |
| j | 10 | 40 | 50 |
| X | 20 | 40 | 40 |
| k | 40 | 40 | 20 |
| l | 50 | 40 | 10 |
| m | 5 | 53 | 42 |
| n | 20 | 60 | 20 |
| p | 40 | 60 | |
| q | 38 | 62 | |
| r | | 80 | 20 |
| s | 20 | 80 | |
| t | | 60 | 40 |

In producing the glass composition provided by the invention, the following procedure is employed:

A glass composition corresponding to about 20% As, 40% Se, and 40% S (designated as composition "X" in the table above) is prepared by weighing out a total of 500 grams of the elements of substantially high purity in the comminuted or granulated form. The elements are proportioned in accordance with the composition desired and are mixed and placed in a "Pyrex" glass container (about 2 inches diameter) provided with a "Pyrex" glass cover adapted to enable a stirring rod to pass through the cover into the container and to enable the provision of an inert atmosphere of nitrogen, argon, etc.

The container is placed in a resistance-wound vertical furnace and heated so that the temperature is raised to 250° C. as fast as possible and held there so as to melt the sulfur and selenium. At this point the mass is stirred in order to maintain a uniform mixture between the liquid phase and the solid arsenic and to facilitate a smooth reaction. Upon completion of stirring, the mass is further heated at a maximum rate to 500° C. and the mixture stirred again. An exothermic reaction ensues as arsenic gradually reacts with the molten sulfur and selenium, the stirring being continued for about an hour at this temperature.

The molten bath, which weighs about 500 grams, is then cooled down to about 450° C. at a rate of about 8° C. to 10° C. per hour while stirring at a continually decreasing rate to prevent striae, and the stirrer is then removed. The melt is then cooled to 300° C. over a twenty four hour period, this rate of cooling being important to prevent striae. At the end of this period, the composition is cooled from 300° C. to 185° C. in four hours.

After the temperature has reached 185° C., the composition is subjected to an annealing step comprising cooling it slowly to 155° C. over a twenty four hour period. The power of the furnace is turned off and the composition finally furnace-cooled to room temperature.

The glass product obtained from the "Pyrex" glass container is about 4 inches long and 2 inches in diameter. In subjecting the glass to a transmission test, a disc of about one quarter inch thick is first obtained from near the center of the cylindrical product by cutting with a diamond wheel. The slice is ground to a thickness of about 2 mm. and polished in an essentially conventional manner.

The resulting test sample is then mounted in a sample holder and put into the sample beam of a Baird double-beam recording infrared spectrophotometer (manufactured by the Baird Atomic Co. of Cambridge, Mass.). The instrument is operated to record the transmission characteristics of infrared radiation ranging from 2 to 16 microns in wavelength. The results showed that this glass (20% As, 40% Se and 40% S) indicated a rather high cut-off at a wave length of about 13.3 microns.

A glass composition comprising 40% As, 20% Se, and 40% sulfur (composition "e") indicated a cut-off at a wavelength of about 13 microns. Another glass composition comprising 40% As, 40% Se, and 20% S (composition "k") exhibited a cutoff of about 13.2 microns. Still another composition comprising 20% As, 60% Se and 20% S (composition "n") exhibited a rather high cut-off of about 13.5 microns.

It will be apparent from the foregoing examples that selenium combined with arsenic and sulfur results in improved transmission properties. Such properties are obtained by producing glasses within the area delineated by solid line E and the axes, particularly when produced over the composition range comprising about 10% to 45% As, about 5% to 85% sulfur and substantially the balance about 5% to 85% Se.

While the invention is concerned substantially with the ternary compositions disclosed and claimed herein, it will be appreciated that small amounts of other ingredients may be tolerated in the ternary composition without adversely affecting substantially the transmission properties of the glass provided by the invention.

It will be seen that I have described improved glass compositions and have delineated a new field of glasses. My glasses have good infrared-transmitting properties and provide certain security in the visual range by virtue of their substantial opacity to visible light.

While I have described the invention in detail with particular reference to certain glasses, it will be understood that the invention is of broader scope and is defined in the claim which follows.

I claim:

An optical, infrared-transmitting glass composition consisting essentially of a fused, vitreous, non-crystalline ternary mixture of arsenic, sulfur and selenium in amounts ranging from about 10% to 45% As, about 5% to 85% sulfur, and substantially the balance in an amount ranging from about 5% to 85% selenium.

References Cited in the file of this patent

UNITED STATES PATENTS

| | | |
| --- | --- | --- |
| 1,917,725 | Lenander | July 11, 1933 |
| 2,252,131 | Lyle | Aug. 12, 1941 |

OTHER REFERENCES

Jour. of Optical Society of America, pages 823, 1154–1157, vol. 43 (1953).

Glass Industry, page 285, Sept. 25, 1935.